US008899869B2

(12) United States Patent
Valois

(10) Patent No.: US 8,899,869 B2
(45) Date of Patent: Dec. 2, 2014

(54) ROTARY FLEXURE BEARING

(76) Inventor: Michael Valois, Lancaster, MA (US)

( * ) Notice: Subject to any disclaimer, the term of this patent is extended or adjusted under 35 U.S.C. 154(b) by 466 days.

(21) Appl. No.: 12/852,968

(22) Filed: Aug. 9, 2010

(65) Prior Publication Data

US 2012/0034027 A1  Feb. 9, 2012

(51) Int. Cl.
F16C 11/12 (2006.01)

(52) U.S. Cl.
CPC .................................... F16C 11/12 (2013.01)
USPC ................ 403/291; 403/1; 403/221; 464/100

(58) Field of Classification Search
CPC ............ F16C 11/12; F16F 1/02; F16F 1/025; F16F 1/324
USPC ........... 403/1, 291, 28, 335, 300, 221, 29, 30, 403/306, 330, 336, 337; 259/200.1, 200.2, 259/200.3, 221.3; 464/84, 100, 101, 160, 464/161; 267/154, 160, 181, 182; 285/224; 359/200.1, 200.2, 200.3, 221.3
See application file for complete search history.

(56) References Cited

U.S. PATENT DOCUMENTS

| 2,291,612 | A | * | 8/1942 | Draper | 73/504.09 |
|---|---|---|---|---|---|
| 2,690,014 | A | * | 9/1954 | Bentley et al. | 89/202 |
| 2,702,369 | A | * | 2/1955 | Dreyfus | 324/145 |
| 2,735,731 | A | * | 2/1956 | Freebairn, Jr. et al. | 403/291 |
| 2,931,092 | A | * | 4/1960 | Humphrey | 29/898.042 |
| 3,073,584 | A | * | 1/1963 | Troeger | 267/160 |
| 3,648,999 | A | * | 3/1972 | Bauer | 267/160 |
| 3,764,228 | A | * | 10/1973 | Shook | 416/93 R |
| 3,807,029 | A | * | 4/1974 | Troeger | 29/436 |
| 3,813,089 | A | * | 5/1974 | Troeger | 267/160 |
| 3,825,992 | A | * | 7/1974 | Troeger | 29/436 |
| 3,856,366 | A | * | 12/1974 | Weisbord et al. | 403/291 |
| 4,792,708 | A | * | 12/1988 | Boyer | 310/15 |
| 4,802,784 | A | * | 2/1989 | Brooks | 403/24 |
| 4,812,072 | A | * | 3/1989 | Brooks | 403/24 |
| 5,620,169 | A | * | 4/1997 | Payne | 267/160 |
| 6,050,556 | A | * | 4/2000 | Masuda et al. | 267/161 |
| 6,146,044 | A | * | 11/2000 | Calvet | 403/119 |
| 6,257,957 | B1 | * | 7/2001 | Murray et al. | 451/9 |
| 6,275,624 | B1 | * | 8/2001 | Seddon | 385/16 |
| 6,422,791 | B1 | * | 7/2002 | Pallini et al. | 405/224.2 |
| 7,270,319 | B2 | * | 9/2007 | Culpepper | 267/160 |
| 2010/0067980 | A1 | * | 3/2010 | Kibel | 403/291 |
| 2010/0296862 | A1 | * | 11/2010 | Baudasse | 403/291 |

* cited by examiner

Primary Examiner — Daniel P Stodola
Assistant Examiner — Matthew R McMahon
(74) Attorney, Agent, or Firm — Lambert & Associates; Gary E. Lambert; David J. Connaughton, Jr.

(57) ABSTRACT

This rotary flexure bearing consists of concentric inner and outer hubs connected by compound flexure stages. These compound flexure stages provide the angular compliance required for bearing rotation as well as compliance for flexure foreshortening while holding a constant axis of rotation over the entire range of motion. This design offers large angular displacement, low operating stress, low operating torque, and high stiffness in the five noncompliant degrees of freedom. The rotary flexure bearing described herein has applications in precision mechanics, particularly opto-mechanics. Specific applications include but are not limited to wafer and reticle alignment stages used in microlithography systems, mirror pointing and scanning mechanisms used in tactical and spaceborne systems, as well as flip-in mechanisms used in multiple field of view optical systems.

4 Claims, 4 Drawing Sheets

ROTARY FLEXURE BEARING

U.S. PATENT DOCUMENTS

| U.S. PATENT DOCUMENTS | | | |
| --- | --- | --- | --- |
| 2,291,612 | 8/1942 | Draper | 73/504.09 |
| 2,690,014 | 9/1954 | Draper | 33/322 |
| 2,735,731 | 2/1956 | Freebairn | 74/5.4 |
| 2,931,092 | 4/1960 | Humphrey | 403/291 |
| 3,073,584 | 1/1963 | Troeger | 464/100 |
| 3,807,029 | 4/1974 | Troeger | 29/416 |
| 3,813,089 | 5/1974 | Troeger | 267/160 |
| 3,825,992 | 7/1974 | Troeger | 29/436 |
| 4,802,784 | 2/1989 | Brooks | 403/291 |
| 4,812,072 | 3/1989 | Brooks | 403/291 |
| 5,620,169 | 4/1997 | Payne | 267/160 |
| 6,146,044 | 11/2000 | Calvet | 403/119 |

BACKGROUND OF THE INVENTION

This invention generally relates to a flexure based rotary guide bearing. Flexures have been used successfully in simple and inexpensive as well as complicated and expensive motion systems for centuries. Since they operate by bending, not rolling or sliding, flexures have the inherent advantage of friction-free motion. This key feature allows engineers to build positioning systems with nearly unlimited precision and accuracy. They are also easy to design and fabricate. However, even with these desirable attributes there are few flexure based bearings available commercially. Therefore, it is common practice for an engineer to design custom flexure systems while developing a new mechanism. The rotary flexure bearing described herein is particularly well suited for integration into precision motion systems and opto-mechanical mechanisms where friction-free rotation over a limited angular range is required. It also has a flexure configuration that scales easily without compromising the operating principle, making this concept a convenient basis for a family of rotary flexure bearings. In addition to applications in precision mechanics, this bearing can be used in hostile operating conditions (extreme temperatures, extreme changes in temperature, vacuum, corrosive environment, contaminated environment . . . ) that normally prohibit use of conventional bushings, rolling element bearings, or gas lubricated bearings.

SUMMARY OF THE INVENTION

Motivation for the proposed rotary flexure bearing is partially based on the limited availability of high quality rotary flexure bearings. The operating principle of the most popular commercial offering continues to be based on a design from the mid twentieth century (U.S. Pat. No. 3,073,584, Troeger, 1963, and U.S. Pat. No. 2,931,092, Humphrey, 1960). Consequently, there are some shortcomings associated with these flex-pivots that engineers have had to overcome or accept.

Four of the shortcomings are:

1) The operating principle of these flex-pivots is based on beams which bridge the gap from a fixed base to a free section. The beams cross each other at 90° in the relaxed state, creating an instantaneous axis of rotation where they cross. When the free section is rotated, the beams bend thereby shifting the axis of rotation away from the relaxed location. The deformed shape of these beams is a function of angular deflection, so the location of the axis of rotation is a function of angular deflection.

2) Since the central portion of these flex-pivots is occupied by the beams, it is not possible to use them in a system where mechanics or light must pass through the flex-pivot unobstructed along the major axis.

3) These flex-pivots are typically made of multiple pieces of 400 series stainless steel that have been brazed together. This choice of material and fabrication technique favors mass production but limits application to environments benign enough for 400 series stainless steel and the brazing material. Failure of any brazed joint could cause catastrophic system failure.

4) In addition to a constantly shifting axis of rotation and multiple single point failure sites, the radial stiffness of this beam arrangement is not radially symmetrical.

Readily available high quality materials and manufacturing techniques that were not available at the time these flex-pivots were conceived can be used to create high performance alternatives. The proposed rotary flexure bearing addresses the shortcomings listed above as follows:

1) The operating principle of the proposed rotary flexure bearing is based on multiple compound flexure stages that have been arranged into concentric circular segments. The resulting system is a rotary flexure bearing with a fixed axis of rotation.

2) The compound flexure stages used in the proposed rotary flexure bearing do not occupy the central portion of the rotary flexure bearing. A centrally located hole passing through the inner hub can be used to allow mechanics or light to pass through the proposed rotary flexure bearing unobstructed along the major axis.

3) The proposed rotary flexure bearing is a seamless monolithic structure. The axial cross-section of the proposed rotary flexure bearing remains constant along the entire length permitting use of the wire EDM process for fabrication of this rotary flexure bearing from any metal. This constant axial cross-section also simplifies the design of a mold for making the proposed rotary flexure bearing from non-metallic materials such as plastic.

4) The radially symmetrical design of the proposed rotary flexure bearing yields a radially symmetrical stiffness.

DETAILED DESCRIPTION OF THE INVENTION

Figure 1:
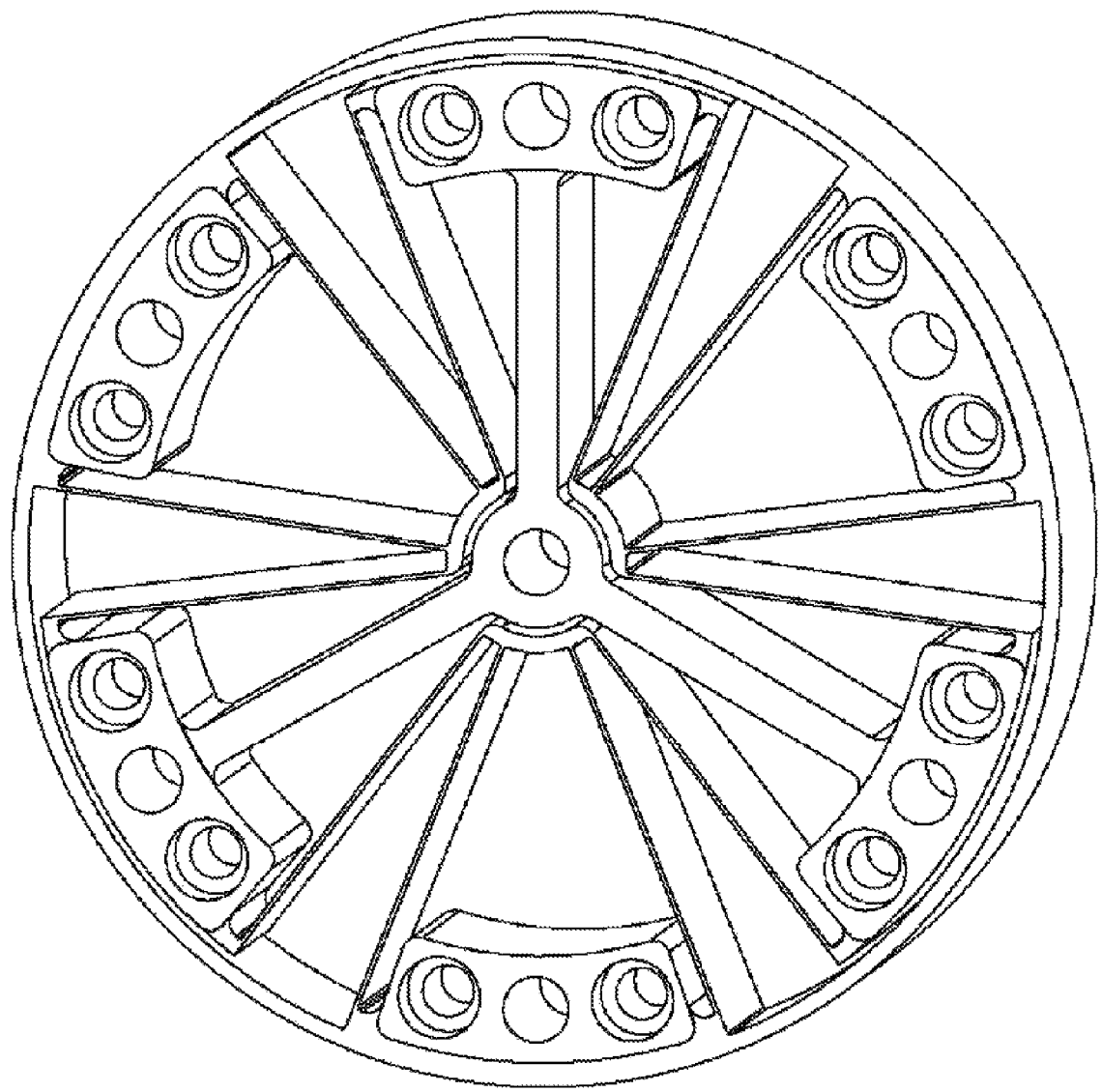
FIG. 1: Perspective view of the proposed rotary flexure bearing.
Figure 2:
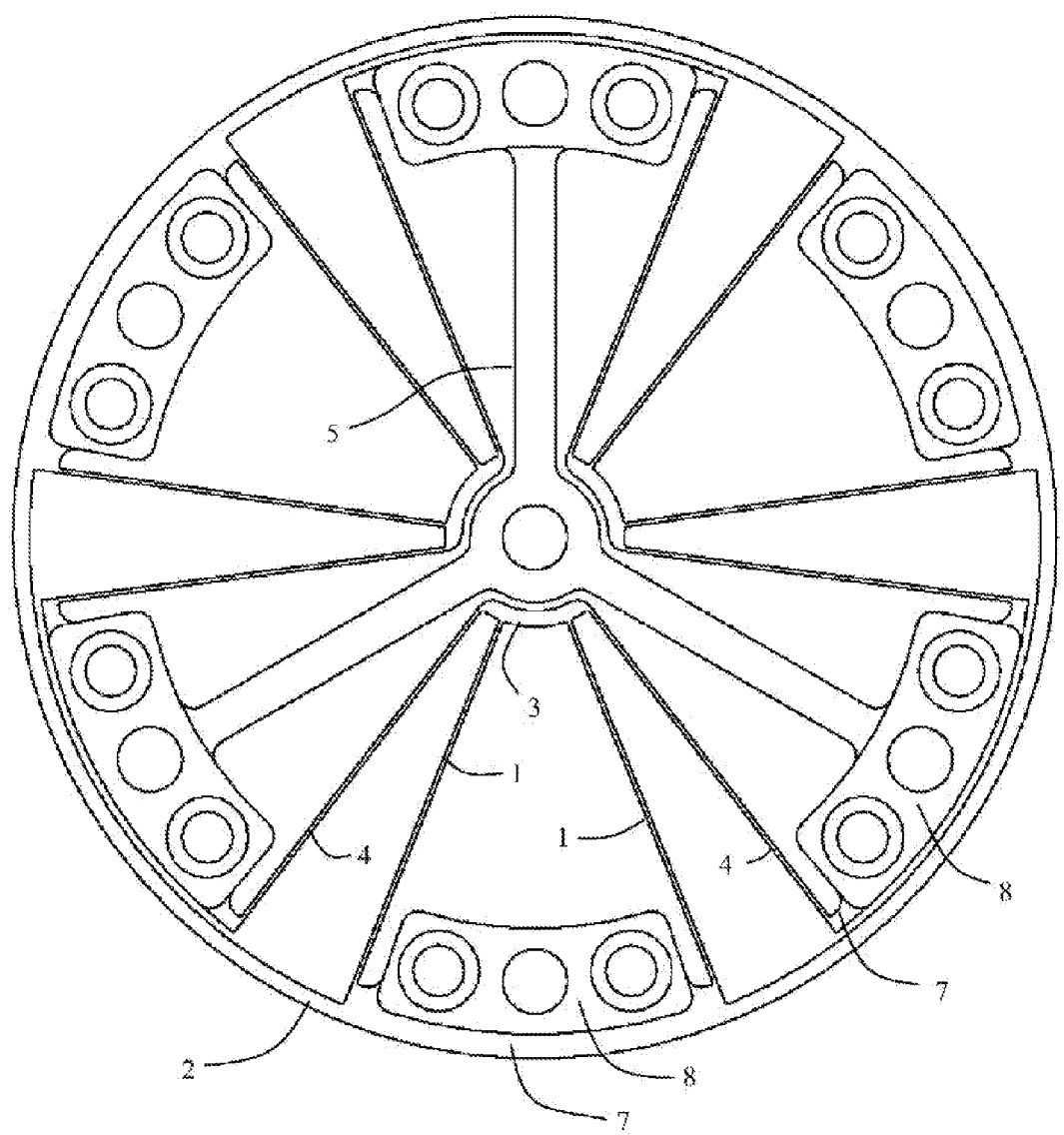
FIG. 2 Front view of the proposed rotary flexure bearing shown at the relaxed state.
Figure 3:
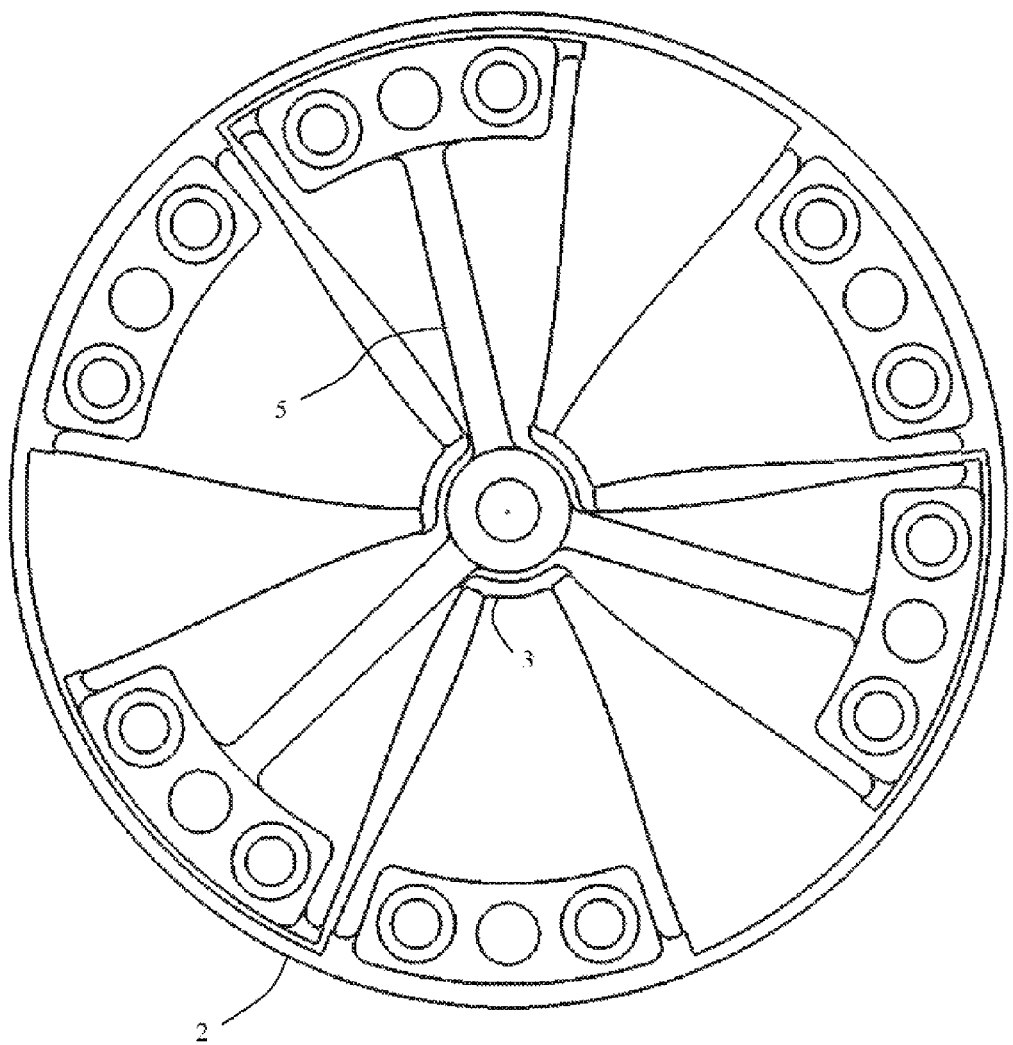
FIG. 3 Front view of the proposed rotary flexure bearing shown rotated.
Figure 4:
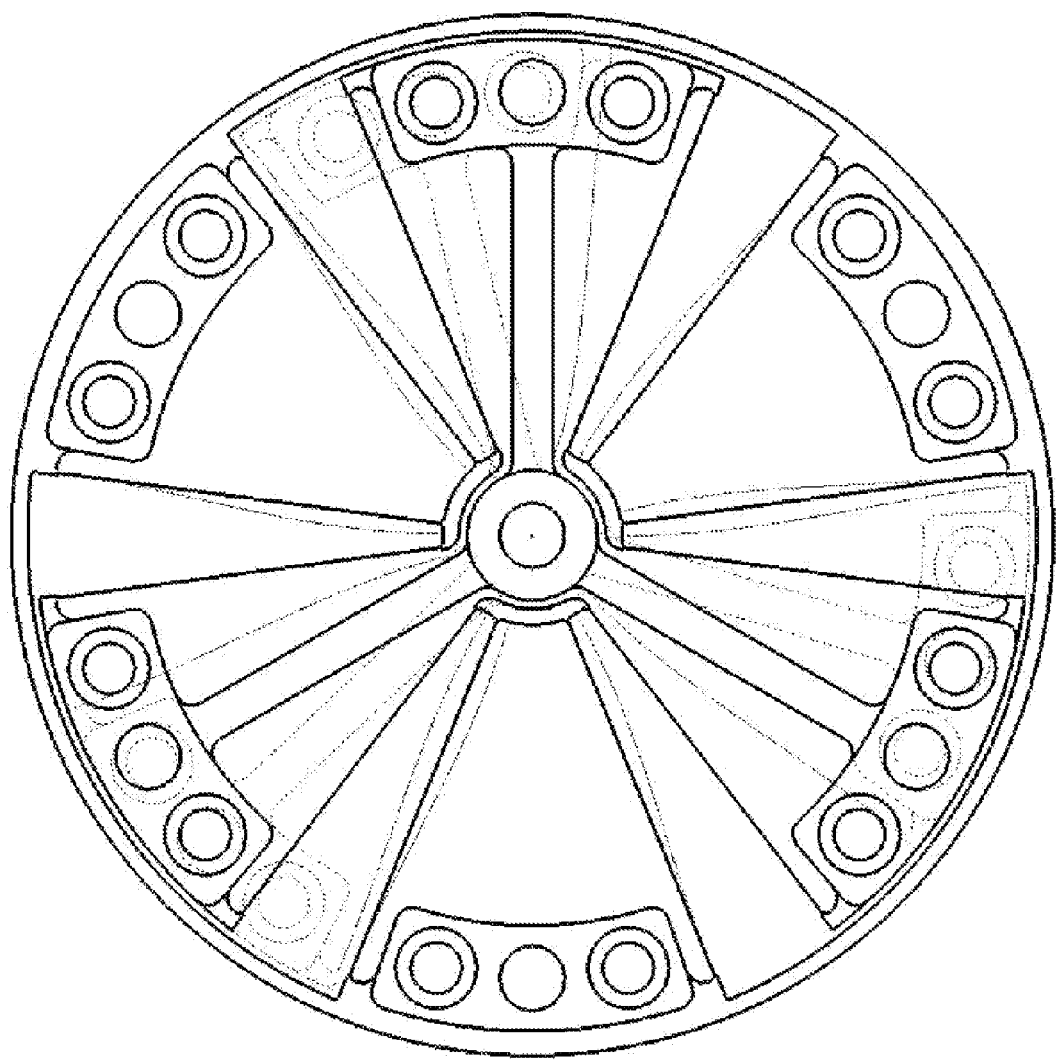
FIG. 4 Front view of the proposed rotary flexure bearing shown at the relaxed state and rotated.

A compound flexure stage is the basis of the proposed rotary flexure bearing. To help illustrate the operating principle and design of this compound flexure stage, a rotary flexure bearing with three compound flexure stages is described herein. Each compound flexure has exactly four blade flexures. All twelve blade flexures are the same thickness, width, length, and made of the same material, therefore have the same stiffness. The two inner blade flexures 1 in each compound stage connect the outer hub 2 of the rotary flexure bearing to an intermediate link 3. The two outer blade flexures 4 in each compound stage connect the inner hub 5 to the intermediate link 3. Each of the three compound stages is defined by one inner blade flexure stage, having exactly two blade flexures, and one outer blade flexure stage, having exactly two blade flexures. The inner blade flexure stage consists of the inner blade flexures 1 and the intermediate link 3 while the outer blade flexure stage consists of the outer blade flexures 4 and intermediate link 3. The intermediate link 3 is shared by both the inner and outer blade flexure stages and allows the two stages to work together as a complete compound flexure stage. The inner blade flexure stage has two functions. The first is to serve as a pivot for the intermediate link 3. The inner blade flexure stage guides the intermediate link 3 around the rotary flexure bearing major axis. The second function is to foreshortening the same amount as the outer blade flexure stage so that the system of four blade flexures in the compound flexure stage is not over constrained. The use of flexures that have the same geometry and stiffness in the inner and outer stages makes this complimentary foreshortening possible, and the complimentary foreshortening allows the compound flexure stage to operate over large angular deflections while experiencing low stress. The outer blade flexure stage rotates around the rotary flexure bearing major axis with the inner hub 5 and also with the intermediate link 3 which is guided by the inner blade flexure stage. Therefore the inner and outer blade flexure stages experience the same angular displacement, and the same blade flexure foreshortening. The two outer blade flexures 4 work together as springs in parallel between the inner hub 5 and intermediate link 3. The two inner blade flexures 1 work together as springs in parallel between the intermediate link 3 and the outer hub 2. As a system, the outer blade flexure stage flexures and inner blade flexure stage flexures work together as springs in series between the inner hub 5 and outer hub 2. Referring to FIGS. 4 and 5, when the inner hub 5 is rotated with respect to the outer hub 2 the intermediate link 3 also rotates around the bearing major axis, but only half as much as the inner hub 5. This is because the intermediate link 3 is at the mid span of what is essentially a continuous spring bridging the gap between the inner hub 5 and outer hub 2. The deflection of the spring at mid-span is half the deflection at the end. Since the blade flexures have the same stiffness and share the same loading, all twelve bend the same amount in the same "S" shape. They also experience the same amount of foreshortening at the same rate of change while the inner hub 5 rotates with respect to the outer hub 2. This common and simultaneous change in blade flexure length results in outward radial translation of the intermediate link 3 while the inner hub axis of rotation remains constant and coaxial with the bearing major axis.

Unsupported free ends of flexures are a source of instability in some multiple flexure mechanisms. These free ends are easily excited by external shock and vibration as well as the normal motion of the mechanism. The intermediate link 3 is at the free ends of the blade flexures in the compound stage used in this rotary flexure bearing design. However, the intermediate link 3 is not free to move in an independent fashion like the inner hub 5 or outer hub 2. When the hubs are fixed, the intermediate link 3 is also fixed. When the inner hub 5 is rotated the outer blade flexures 4, which move with the inner hub 5, rotate the intermediate link 3 which is guided by the inner blade flexures 1. This regulated motion is made possible by the non-parallel blade flexure arrangement in the compound stage. If the four blade flexures were parallel to each other, the intermediate link 3 would be free to move while the blade flexures bend independent of inner hub 5 or outer hub 2 movement. Since the four blade flexures are not parallel, an over constrained condition exists when attempting to move the intermediate link 3 independent of the inner hub 5 or outer hub 2. The intermediate link 3 is not free to move independently, so this flexure arrangement is not subject to undesirable excitations of the flexure free ends. The controlled motion of the intermediate link 3 in this compound flexure stage helps to reject external disturbances and creates a fast settling mechanism.

Lateral clearance between the edges of the blade flexures and instrument mounting surface is required for free operation of the flexure bearing. This clearance can be achieved by relieving the instrument mounting surfaces adjacent to the blade flexures or relieving the face of the flexure bearing 7 leaving raised coplanar pads 8 on the bearing inner hub 5 and outer hub 2. Features such as screw holes and dowel pin holes can be machined into these coplanar pads 8 to ease integration and alignment.

What is claimed is:

1. A rotary flexure bearing, comprising:

an inner hub having a substantially cylindrical core which has a clear and unobstructed hole passing through the entire length of said substantially cylindrical core and a plurality of essentially equal length radial spokes fixed to said substantially cylindrical core which extend radially outward from the outer surface of said substantially cylindrical core;

an outer hub having a substantially cylindrical interior that is greater in diameter than the major diameter of said plurality of spokes on said inner hub and having the major axis of said substantially cylindrical interior aligned coaxially with the major axis of said substantially cylindrical core of said inner hub;

a compound flexure stage which connects the outermost end of adjacent said spokes on said inner hub to the substantially cylindrical interior of said outer hub comprising a first stage having exactly two essentially identical first stage flexure members having the outermost end of each said first stage flexure members fixed to said substantially cylindrical interior of said outer hub and the innermost end of each said first stage flexure members fixed to a circular segment member located on a radius greater than the major radius of said inner hub cylindrical core and less than the radius of said outer hub cylindrical interior, and a second stage having exactly two second stage flexure members which are essentially identical to said first stage flexure members with the outermost end of each said second stage flexure member fixed to the outermost end of said adjacent spokes on said inner hub and the innermost end of each said second stage flexure member fixed to said circular segment member to which the innermost end of each said first stage flexure member is also fixed;

wherein the two first stage flexure members and two second stage flexure members are each formed as a blade having a thick width and a thin length, each blade being oriented such that the thin length is perpendicular to the major axis of said substantially cylindrical core of said inner hub, while the thick width is parallel to the major axis of said substantially cylindrical core of said inner hub; and wherein each flexure member blade is flexible along the thin length between the innermost end and outermost end into an "S" shape, such that the inner hub and outer hub are capable of axial rotation with respect to one another.

2. The rotary flexure bearing of claim 1 wherein: all members described in claim 1 are formed from the same piece of material creating a seamless and continuous monolithic structure.

3. A rotary flexure bearing comprising:
a substantially cylindrical outer hub;
a substantially cylindrical inner hub concentrically arranged with the outer hub, and having at least two radially extending legs, wherein each of the at least two legs forms a circumferential projection extending beyond both sides of the leg at a distal end of the leg away from the inner hub;
four outer blades, one of the four outer blades extending towards the substantially cylindrical inner hub from an edge of one of two sides of the circumferential projection of each of the at least two legs, each of the four outer blades being flexible;
at least two intermediate links positioned in a space between the outer hub and the inner hub, each intermediate link being directly connected to two adjacent legs of the at least two legs by one of the outer blades from each adjacent leg; and
two inner blades extending from each of the at least two intermediate links, the inner blades of each of the two intermediate links directly connecting the two intermediate links to the outer hub.

4. A rotary flexure bearing comprising:
a substantially cylindrical outer hub;
a substantially cylindrical inner hub concentrically arranged with the outer hub, and having two radially extending legs, wherein each of the two legs forms a circumferential projection at a distal end of each of the two legs, away from the inner hub;
a first outer blade extending inwardly toward the substantially cylindrical inner hub from an edge of the circumferential projection of a first of the two legs, a second outer blade extending inwardly toward the substantially cylindrical inner hub from an edge of the circumferential projection of a second of the two legs;
an intermediate link positioned in a space between the outer hub and the inner hub, the intermediate link being connected to the first outer blade on a first side, and the second outer blade on a second side;
two inner blades extending from the intermediate link directly connecting the intermediate link to the outer hub;
wherein the first and second outer blade, and the two inner blades all have a thick width and a thin length, each blade being oriented such that the thin length is perpendicular to a major axis of the substantially cylindrical inner hub, while the thick width is parallel the major axis of the substantially cylindrical inner hub; and
wherein each of the first and second outer blades and the two inner blades being flexible along their thin lengths into an "S" shape, the first and second outer blade having lengths between the two legs and the intermediate links, the two inner blades having lengths between the intermediate link and outer hub, the first and second outer blade, and two inner blades being configured such that the substantially cylindrical inner hub and substantially cylindrical outer hub are axially rotatable with respect to one another.

* * * * *